Feb. 6, 1968 L. A. URBAN 3,367,565
COMPRESSOR STATOR VANE CONTROL
Filed Jan. 21, 1965
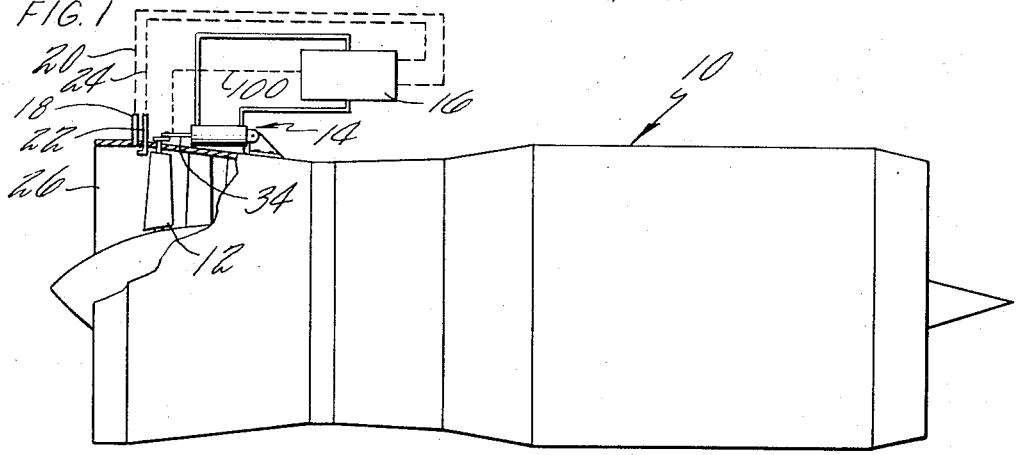
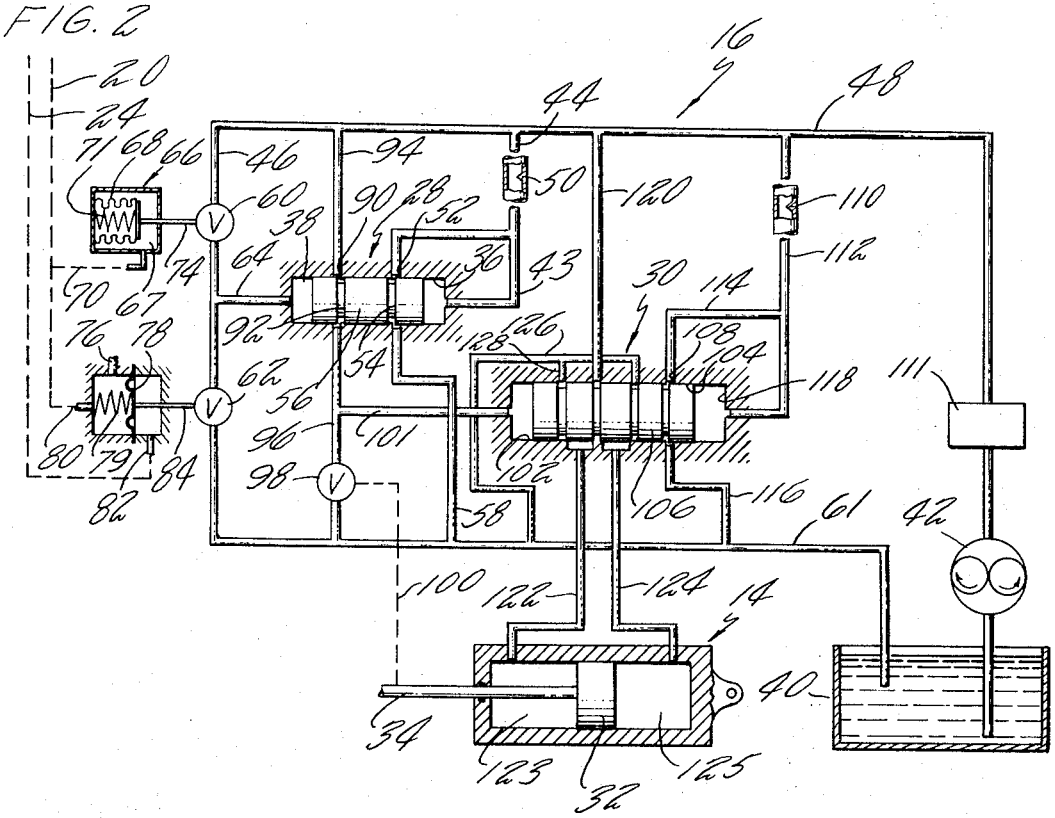
INVENTOR
LOUIS A. URBAN
BY Norman Friedland
ATTORNEY United States Patent Office 3,367,565
Patented Feb. 6, 1968

3,367,565
COMPRESSOR STATOR VANE CONTROL
Louis A. Urban, Granby, Conn., assignor to United Aircraft Corporation, East Hartford, Conn., a corporation of Delaware
Filed Jan. 21, 1965, Ser. No. 426,796
11 Claims. (Cl. 230—114)

This invention relates to stator vane controls and particularly to controls that vary the angle of the vanes of a stator of a compressor of the type utilized in a turbine type of power plant.

As is generally well known in the art, the purpose of varying the stator blade angles is to change the direction and velocity of the engine air flow with varying engine conditions in such a manner as to optimize the angle of attack of the air impinging on the rotor blades of the compressor. In the heretofore known controls it is customary to schedule the angle of the stator blades as a function of the corrected speed of the rotor which is defined as the speed of the rotor divided by the square root of a compressor inlet temperature.

I have found that I can not only simplify a control for the stator blade angles but also can enhance its accuracy and improve the operation and the efficiency of the compressor by making the control respond to the air flowing through the compressor. In my proposed stator blade angle control the engine parameter sensed to measure the air flowing through the engine may be either the absolute Mach number leaving the stator or the axial Mach number of the air entering the stator. While this invention will be described wherein the preferred embodiment utilizes the axial Mach number of the air entering the stator by sensing the static and total pressures and computing them to obtain the ratio of the difference between total and static pressure to static pressure signals, this invention embodies the situation where the difference is ratioed to total pressure. Thus, in the preferred embodiment, the stator vane blade angle is scheduled as a function of the ratio of the difference between total and static pressure to static pressure $$\left(\frac{P_t - P_s}{P_s}\right)$$

It is therefore an object of this invention to provide an improved control for scheduling the stator vane blade angle as a function of the weigh flow of the air flowing through the compressor of a turbine type power plant.

It further is an object of this invention to provide in a control, as described, means for scheduling the stator vane blande angle as a function of either the absolute Mach number leaving the stator or the axial Mach number of the air entering the stator.

A still further object of this invention is to control the stator vane blade angle as a function of either the ratio of the difference between total and static pressure to static pressure or the ratio of the difference of total and static pressure to total pressure as measured at the inlet of the stator.

A still further object of this invention is to provide hydraulic computing means that respond to static and total pressure at the inlet of the stator and create an hydraulic pressure to control an actuator to position the blade angle of the stator vane as a function of the ratio of the difference between total and static pressure to either static or total pressure sensed at the inlet of the stator.

Other features and advantages will be apparent from the specification and claims and from the accompanying drawings which illustrate an embodiment of the invention.

FIGURE 1 is a schematic view illustrating the stator blade angle control and actuator mounted in relationship to a turbine type of power plant.

FIGURE 2 is a schematic illustration showing a preferred embodiment of this invention.

While in its preferred embodiment the actuator is shown to position the blade angle of a stator for an axial type of compressor, it is to be understood that any type of compressor (radial or the combination thereof) falls within the scope of this invention.

Referring now particularly to FIG. 1 which shows a usual type of jet engine, generally indicated by numeral 10 which contains a plurality of circumferentially spaced stator vanes, only one of which is shown, as indicated by numeral 12, actuator 14 and its control 16. The static pressure sensed at the inlet of stator 12 by static pressure probe 18 is fed to control 16 through line 20 and the total pressure sensed at the inlet of stator 12 is sensed by total pressure probe 22 and fed into controller 16 via line 24. (In a control that measures the air flow by the absolute Mach number parameter the static and total pressures would be picked up downstream of the stator vane.) To obtain a more representative value of the pressure gradient around the inlet pressure rakes may be employed.

Obviously, air admitted to the jet engine enters through inlet 26 where it is directed to stator 12 which serves to direct the flow to the blades of the compressor. The angle of the stator blade relative to the incoming air is varied in such a manner as to maintain the direction and velocity of this air so that at varying engine conditions the angle of attack of the air relative to the blades of the compressor is at its optimum or nearly optimum position.

Now referring to FIG. 2 which shows the control 16 comprising scheduling valve, generally indicated by numeral 28, and servo valve, generally indicated by numeral 30, both acting cooperatively serve to schedule the position of actuator 14 to vary the blade angle of the stator as a function of Mach number or air flow, in order to optimize the angle of attack of the air on the rotor blades.

The hydraulic circuitry which will be described hereinbelow serves to determine an area ratio whose value is equivalent to the ratio of the difference between the sensed total and static pressure to the sensed static pressure to establish desired or scheduled blade poition. Piston 32 which moves by virtue of servo valve 30 is indicative of actual blade angle and thru a feedback connection to the hydraulic system assures that there is no discrepancy between desired or scheduled blade angle and actual blade angle.

To appreciate the operation of the computing hydraulic circuit it is best to consider the pressures applied to chambers 36 and 38 in scheduled valve 28 and the variable and fixed orifices working in conjunction therewith to control these pressures. Hydraulic fluid from reservoir 40 is pressurized by schematically shown pump 42 and delivered into lines 44 and 46 via line 48. Fluid admitted into chamber 36 first passes through fixed restriction 50 while a portion of the fluid is metered through port 52 which is regulated by virtue of the metering land 54 (variable restrictor) on spool 56 of schedule valve 28. The ported fluid discharging from the metering land 54 is returned to the reservoir through lines 58 and 60. It can thus be seen that the pressure in chamber 36 which is intermediate these two serially disposed orifices is controlled by the area ratio relationship between fixed restrictor 50 and variable restrictor 54 which is mounted in serial relationship therewith.

Next, considering the pressure being created in chamber 38 which is taken at some point intermediate of valves 60 and 62 via line 64. As will be explained hereinbelow, the areas of valves 62 and 60 are made to assume a value proportional to the differential between total pressure and static pressure and static pressure respectively for setting up an area ratio between the two restrictors so that the value of the created area ratio is proportional to the ratio of the difference between total and static pressure to static pressure. Hence, the pressure in chamber 38 will cause spool 56 of the schedule valve 28 to move until the area ratio of restrictor 50 and metering land 54 create a pressure in chamber 36 which generates a force equal and opposite of the force generated by the pressure in chamber 38, created by the area ratio of variable restrictors 60 and 62. Thus it is apparent that to arrest motion of spool 56 of valve 28 the ratio of areas 50 and 54 must equal the ratio of areas 60 and 62, and hence the position of spool 56 is proportional to the ratio of the difference between static and total to static pressure.

As mentioned above, in order to commute the relationship of $$\frac{P_t - P_s}{P_s}$$

the area of valve 60 assumes a value proportional to the static pressure upstream of stator vane 12. While any suitable actuator may be employed which will position the valve proportional to the sensed pressure, actuator 65, schematically shown, consisting of evacuated bellows 68 disposed in chamber 67 is illustrative. Static pressure picked up by probe 18 and fed through line 20 is admitted into chamber 67 to act on bellows 68 via line 70 and spring 71 acts internally of bellows 68. Hence, the position of bellows 68, which is a function of the static pressure, is transmitted to valve 60 through the connector schematically indicated by numeral 74, for positioning it to define an area which is a function of static pressure.

Valve 62 is made to assume a position such that its area is a function of the difference between total and static pressure. Any suitable actuator which may be of the type schematically illustrated by numeral 76 may be employed. Actuator 76 comprises diaphragm 78 which has one side subjected to the force of spring 79 and static pressure admitted thereto through lines 20 and 80 and the other side subjected to total pressure admitted thereto through lines 24 and 82. Hence, position of diaphragm 78 will be proportional to the difference between total and static pressure, so that valve 62, connected thereto by schematically illustrated mechanical connector 84 will assume a position proportional to the difference between the total and static pressures. Hence, it will be realized that the area ratio of these variable area orifices, namely the areas defined by valves 60 and 62, will be at a value indicative of the ratio of the difference between total and static to static pressure.

This ratio relationship may be better understood by considering the mathematical relationship between the cooperation of fixed restrictor 50, variable restrictor 52 and variable valves 60 and 62. In the explanation to follow the numerical subscripts correspond to the valves and/or restrictors referenced in the drawing, A represents area, and P represents pressure.

From basic hydraulic flow principles the pressure relationship of the fluid passing through line 46 may be expressed as follows:

(1) $$\frac{P_{64} - P_{61}}{P_{46} - P_{61}}$$

The value of Equation 1 equals:

(2) $$\frac{1}{1 + \left(\frac{A_{62}}{A_{60}}\right)^2}$$

Likewise the pressure relationship of the fluid passing through line 44 may be expressed as follows:

(3) $$\frac{P_{43} - P_{58}}{P_{44} - P_{58}}$$

Since $P_{58}$ dumps into $P_{61}$, they are equal. And since $P_{46}$ and $P_{44}$ are fed from common source $P_{48}$, they are equal.

The value of Equation 3 equals:

(4) $$\frac{1}{1 + \left(\frac{A_{54}}{A_{50}}\right)^2}$$

Spool 56 will be in equilibrium when:

(5) $$P_{36} = P_{38}$$

then, from the foregoing (6) $$\frac{1}{1 + \left(\frac{A_{62}}{A_{60}}\right)^2} = \frac{1}{1 + \left(\frac{A_{54}}{A_{50}}\right)^2}$$

Since $A_{62}$ equals $P_t - P_s$ and $A_{60}$ equals $P_s$ then (7) $$\frac{P_t - P_s}{P_s} = \frac{A_{62}}{A_{60}} = \frac{A_{54}}{A_{50}}$$

Hence, $A_{54}$ will be at a value for maintaining equilibrium.

From the foregoing it is apparent that the position of spool 56 is a function of the ratio of the difference between total and static pressure to static pressure. Port 90 is then contoured in such a manner that it represents the schedule of the blade angle for a given value of the ratio of the difference between total and static to static pressure. Hence, land 92 cooperating with port 90 defines an area which is a function of the desired blade angle of the stator vanes. As noted from the drawing, land 92 meters fluid from port 90 to line 96 and eventually to valve 98 which is positioned as a function of the actual blade angle by virtue of being tied to connecting rod 34 by the schematically shown mechanical connection 100.

In a manner similar to that described in connection with scheduled valve 28, the orifice size set by land 92 in relation to port 90, and valve 98 establish a particular area ratio for controlling the pressure of the fluid in line 101 which communicates with chamber 102 in servo valve 30. Land 104 of spool 106 cooperates with port 108 to define an area which is in series relation to fixed restriction 110. When the ratio of the area defined by land 104 and fixed restriction 110 equals the ratio of the area of valve 98 and the area defined by land 92, spool 106 will be in an equilibrium or null position. Hence, this ratio establishes a pressure in line 112 by metering fluid through the servo valve 30 by way of port 108, land 104, line 114 and drain discharge line 116. The pressure created intermediate these two serially connected restrictors is fed into chamber 118 to act on the right-hand end of spool 106. Hence, when the pressure in chamber 118 equals the pressure in chamber 102, the orifice area ratios between 92 and 98 and 110 and 104 will be equal and spool 106 of servo valve 30 will be in an equilibrium position.

Assuming that the scheduled blade angle is at a value different than the actual blade angle, an error will be evidenced which would cause a change in pressure in chamber 102. This, in turn, would cause spool 106 to shift to either the left or to the right serving to meter high pressure fluid discharging from lines 48 and 120 to either lines 122 or 124 depending on the direction of the error. When high pressure is metered into the left-hand side of piston 32, the right-hand side of piston 32 is placed in communication with drain via line 124, servo valve 30 and line 126. Conversely, when high pressure fluid is metered into line 124, line 122 is placed in communication with drain via servo valve 30, lines 128, 126 and 60. Obviously, since valve 98 is directly connected to the position of piston 32, valve 98 will be repositioned to establish a new orifice ratio and spool 106 will move to vary the area of port 108 until the ratio on this side of the valve equals the ratio on the other side and the spool will then be in an equilibrium position.

From the foregoing it is apparent that any error between actual and desired blade angle causes spool 106 of servo valve 30 to move until the orifice ratio on the right-hand side of the servo valve is equal to the orifice ratio on the left-hand side, thus making the position of spool 106 proportional to blade angle error. If an error exists then, it will cause appropriate flow from the servo valve 30 into and out of the chambers 123 and 125 of stator vane actuator 14, which will cause piston 32 to continue to move until it has changed the size of the actual blade angle orifice defined by valve 98 sufficiently to wipe out the error and restore spool 106 of servo valve 30 to a null, or line-on-line position and hence arrest motion on piston 32. At this point the stator blade will be at its proper scheduled value. Box indicated by reference number 111 schematically represents any well-known type of pressure regulating valve that may be employed with this invention depending on the particular application. However, it is to be understood that the use of the constant pressure regulator does not limit the scope of this invention.

Hence, from the foregoing it is apparent that blade angle of the stator vane is scheduled as a function of mach number or weight flow of the air ingested by the compressor. While a particular sensor measuring the mach number was described to illustrate a preferred embodiment, it is to be understood that any other sensor capable of measuring mach number or weight flow as anyone skilled in this art will realize falls within the scope of this invention.

While this inventive concept was described in its preferred embodiment wherein the blade angle of the stator vanes of a compressor is controlled it will be appreciated by anyone skilled in this art that the same principals and mechanism can be employed to control the position of the nozzles of a turbine.

What has been shown by this invention is a control which is simpler than the heretofore known type of controls while yet increasing the accuracy thereof. It has been found that the required rate of change of blade angle by virtue of scheduling it as a function of the ratio between the difference of total and static pressure to static pressure is only about one-fifth of that which is required when the corrected speed is used as the controlling parameter. Thus, a one percent error in corrected speed will result in approximately five times as much error in blade angle as would result from the same percent error when utilizing mach number or weight flow as indicated by $$\frac{P_t - P_s}{P_s}$$

as a parameter. By way of illustration without intending to be limited thereto, the following describes some additional advantages afforded by this invention:

(1) More satisfactory transient response since airflow is being measured instead of calculated.

(2) Better compressor stall protection, since this invention will automatically respond to stall by rapidly changing the stator vane angles in the direction to aid recovery.

(3) A corrected speed scheme cannot recognize the changes in airflow that take place due to engine deterioration; due to altitude Reynold's number effects; and due to the differences in airflow that exist between steady state and either acceleration or deceleration. This invention recognizes any or all of these differences and changes the stator vane angles in a direction to optimize the angle of attack on the rotor blades, thereby improving the efficiency of the compressor; and (4) Since there is no need for speed or temperature sensing, the control may be divorced from the main fuel control which is the heretofore practice, thus giving greater flexibility in optimizing installation considerations. This may be particularly desirable in ducted engine applications, where the number of inter-connecting lines may be minimized and the feedback simplified.

It should be understood that the invention is not limited to the particular embodiments shown and described herein, but that various changes and modifications may be made without departing from the spirit or scope of this novel concept as defined by the following claims.

I claim:

1. For nozzles having walls movable to different positions for defining an opening adapted to control the velocity and direction of air passing therethrough, actuator means connected to said nozzles to vary the position thereof, and control means responsive to the ratio of the difference between total and static pressure to total pressure to control said actuator means for moving said walls to a given position for each value of the ratio of the difference between total and static pressure to total pressure.

2. A control system for mechanism movable to different positions for directing fluid to a rotating member to extract work therefrom or expend work thereon comprising actuator means connected to said mechanism for changing the position thereof and control means responsive to a function of the weight flow of the fluid ingested by said rotary member for controlling said actuator so as to move said mechanism to a given position for each value of the weight flow.

3. For a nozzle having walls movable to different positions to maintain the direction and velocity of fluid passing therethrough so as to obtain substantially optimum angle of attack of the fluid discharging from the nozzle, actuator means connected to said walls for varying the position thereof, control means responsive to the ratio of the difference between total and static pressure to static pressure of said fluid for controlling said actuating means so as to move said walls to a given position for each value of the ratio of the difference between total and static pressure to total pressure.

4. A control for a nozzle movable to different positions, actuator means connected to said nozzle for changing the position thereof, sensing means for sensing the static and total pressure of the fluid adjacent said nozzle, control means connected to said sensing means for computing said sensed static and total pressures to produce a schedule whose value is indicative of the ratio of the difference between total and static pressures to static pressure, and means interconnecting said control means and said actuator for controlling said actuator in accordance with said schedule so as to move said nozzle at a given position for each value of said ratio of the difference between total and static pressure to total pressure.

5. For a turbine type power plant having a compressor with variable stator vanes adapted to change the direction and velocity of the power plant airflow to optimize the angle of attack of the air impinging on the compressor rotor blades, actuating means connected to said variable stator vanes for controlling the angle thereof, control means responsive to a function of the weight flow of the air ingested by the compressor for controlling said actuator means, said control means including a scheduling valve adapted to meter hydraulic fluid in accordance with the ratio of the difference between total and static pressure to static pressure, servo valve means communicating with said metered hydraulic fluid for controlling the position of said actuator, and valve means connected to said actuator for bleeding off said metered fluid as a function of the position of said actuator.

6. For a turbine type power plant having a compressor with variable stator vanes adapted to change the direction and velocity of the power plant airflow to optimize the angle of attack of the air impinging on the compressor rotor blades, actuating means connected to said variable stator vanes for controlling the angle thereof, control means responsive to a function of the air ingested by the compressor for controlling said actuator means, said control means including a scheduling valve, sensing means for measuring the static and total pressure of the air adjacent said stator vanes, hydraulic computing means including a source of hydraulic fluid under pressure and fluid connecting means interconnecting said source and scheduling valve, said hydraulic computing means interconnecting to said sensing means and said scheduling valve to position said scheduling valve in accordance with the computed value of the ratio of the difference between total and static pressure to static pressure, said scheduling valve including metering means for metering fluid from said source to establish a pressure value in accordance with a desired blade angle position, and means responsive to the actual blade angle position for varying said pressure value.

7. For a turbine type power plant having a compressor with variable stator vanes adapted to change the direction and velocity of the power plant airflow to optimize the angle of attack of the air impinging on the compressor rotor blades, actuating means connected to said variable stator vanes for controlling the angle thereof, control means responsive to a function of the Mach number of the air ingested by the compressor for controlling said actuator means, said control means including a first signal producing means responsive to static and total pressure adjacent said stator vanes for producing a first signal indicative of a scheduled blade angle position, second signal producing means responsive to the position of the stator vanes for producing a second signal indicative of the actual blade angle of said stator vanes and output producing means responsive to a value indicative of the difference between said first and second means for positioning said actuator.

8. Control means as claimed in claim 7 wherein said first signal producing means includes a scheduling valve having a contoured metering portion scheduling the desired blade angle by metering hydraulic fluid as a function of the ratio of the difference between said total and static pressure to said static pressure.

9. A control system for a stator vane of a compressor for a turbine type of power plant and adapted to vary the blade angle of the stator vane so as to maintain its discharging air at its substantially optimum angle of attack throughout the operating range of the power plant, comprising actuator means attached to the stator vane for varying its blade angle, control means responsive to a function of the air flowing through said stator vane for controlling said actuator, said control means including a first sensor for measuring the static pressure adjacent said stator vane, a second sensor for measuring total pressure adjacent said stator vane, first valve means in a hydraulic flow passage connected to said first sensor for establishing an orifice area indicative of the static pressure, second valve means in said hydraulic flow passage connected to said first sensor and said second sensor for establishing an orifice area indicative of the difference between total and static pressure, third valve means having hydraulic connection interconnecting said hydraulic passage at a point intermediate said first and second valve and adapted to meter fluid from a source of hydraulic pressure as a function of a desired stator vane blade angle for producing a first signal, feedback means responsive to the position of the actual blade angle assumed by the stator vane for producing a second signal and means connected to said third valve and said feedback means for producing an output signal indicative of the difference between said first and second signal for controlling said actuator.

10. For a nozzle having walls movable to different positions to maintain the direction and velocity of fluid passing therethrough so as to obtain substantially optimum angle of attack of the fluid discharging from the nozzle, actuator means connected to said walls for varying the position thereof, control means for controlling said actuating means, said control means including means responsive to static pressure adjacent said nozzle for producing a first signal, means responsive to the difference between total and static pressure adjacent said nozzle for producing a second signal, feedback means connected to said actuator means for producing a third signal indicative of the position of said actuator, combining means responsive to said first signal and said second signal for producing a fourth signal indicative of the value of the ratio of the first signal to the second signal and means responsive to the difference between said third signal and said fourth signal for controlling said actuator means.

11. For a turbine type power plant having a compressor with variable stator vanes adapted to change the direction and velocity of the power plant air flow to optimize the angle of attack of the air impinging on the compressor rotor blades, actuator means connected to said stator vanes for changing the position thereof, computer means for ascertaining the Mach number of the air passing through said compressor, said computer means including means for sensing the static pressure adjacent said variable stator vanes, means for sensing the total pressure at the proximity of where the static pressure is picked off, and means for ratioing the values of said static and total pressures for producing an output signal, and means responsive to said output signal of said computing means for controlling said actuator means to move said stator vanes to a given position for each Mach number.

References Cited
UNITED STATES PATENTS

| | | | |
|---|---|---|---|
| 1,401,668 | 12/1921 | Brown | 230—114 |
| 2,295,728 | 9/1942 | Gess | 230—114 |
| 2,339,150 | 1/1944 | Codrington | 230—114 |
| 2,385,664 | 9/1945 | Warner | 230—114 |
| 2,705,590 | 4/1955 | Lovesey | 230—114 |
| 2,886,968 | 5/1959 | Johnson | 230—114 |

HENRY F. RADUAZO, *Primary Examiner.*

LAURENCE V. EFNER, DONLEY J. STOCKING,
*Examiners.*